United States Patent [19]

Taylor

[11] 4,062,021
[45] Dec. 6, 1977

[54] INK RECORDER WITH GROOVED PRESSURE ROLLER FEED

[75] Inventor: Leonard Harold Taylor, Loudwater, England

[73] Assignee: Perkin-Elmer Limited, Beaconsfield, England

[21] Appl. No.: 722,191

[22] Filed: Sept. 10, 1976

[30] Foreign Application Priority Data

Sept. 12, 1975 United Kingdom ............... 37511/75

[51] Int. Cl.² ......................... G01D 15/24; G03B 1/24
[52] U.S. Cl. ........................................ 346/136; 226/84
[58] Field of Search ..................... 346/136; 226/84, 85

[56] References Cited

U.S. PATENT DOCUMENTS

| | | | |
|---|---|---|---|
| 2,660,380 | 11/1953 | Blackman et al. | 346/136 UX |
| 3,160,465 | 12/1964 | Oppel | 346/136 X |
| 3,285,484 | 11/1966 | Johnson | 346/136 X |
| 3,475,763 | 10/1969 | Hardway, Jr. | 346/136 |

Primary Examiner—George H. Miller, Jr.
Attorney, Agent, or Firm—S. A. Giarratana; F. L. Masselle; J. D. Crane

[57] ABSTRACT

An anti-smudge bar for a recorder is disclosed wherein the recorder has a drive means for advancing a strip chart in a longitudinal direction. The strip chart, as it advances, passes over a platen disposed upstream of the advancing means. A pressure roller adjacent the upstream side of the platen presses the strip against the platen. The pressure roller has a plurality of longitudinal grooves spaced by sharp crests which contact the chart in a manner preventing smudging of wet ink traces previously recorded on the chart. The ink traces are recorded on the chart by a recording pen which is movable in a direction transverse to the direction of chart movement. The roller and the pen are lifted from chart contact whenever the chart direction is reversed to permit subsequent recording on a chart segment previously recorded on.

13 Claims, 1 Drawing Figure

U.S. Patent
Dec. 6, 1977
4,062,021
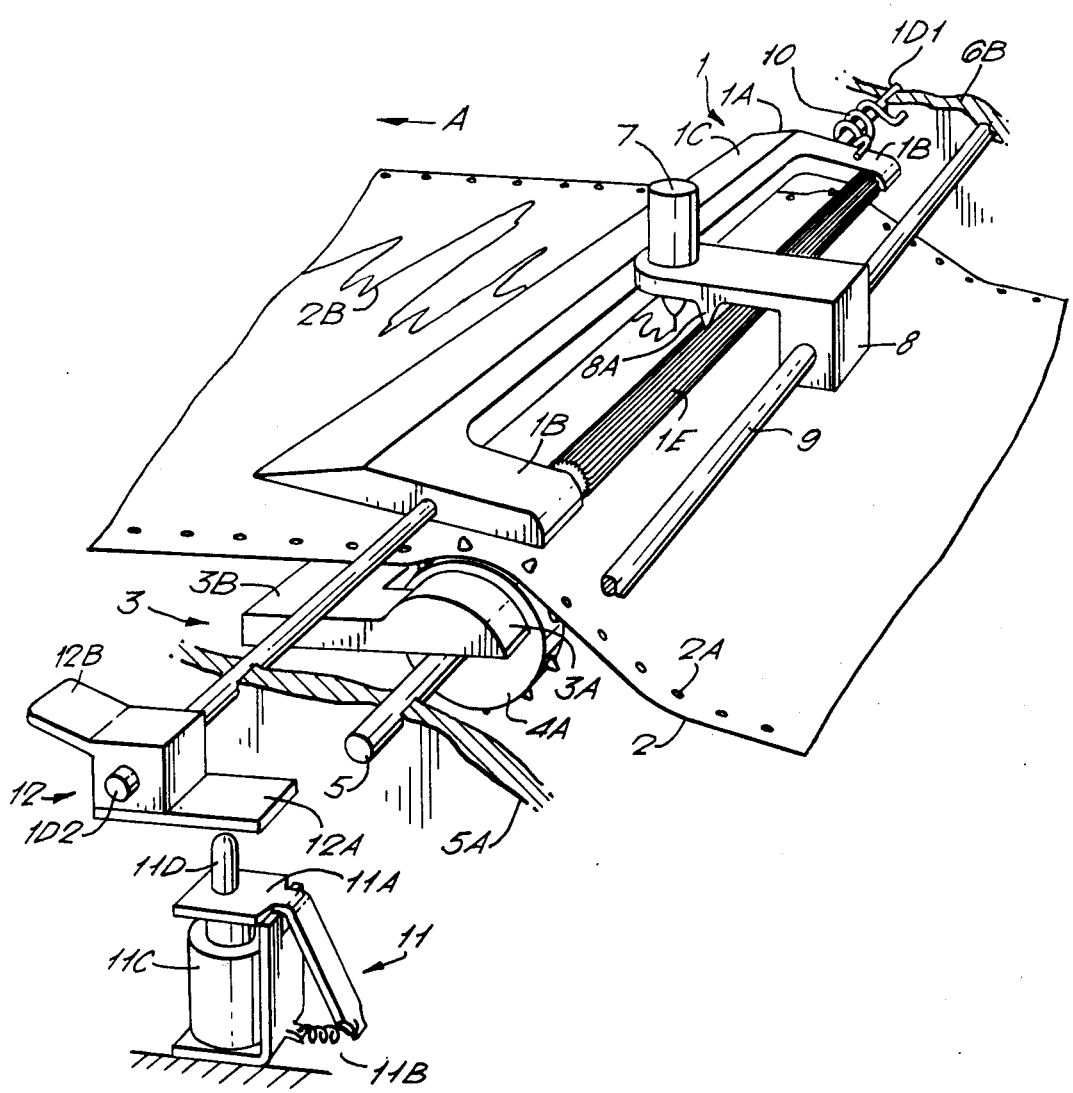

INK RECORDER WITH GROOVED PRESSURE ROLLER FEED

This invention relates to recording apparatus of the type comprising means for transporting a strip of ink receptive medium along its length in response to an independent variable quantity relatively to a recording pen movable transversally to and in contact with said strip in response to a dependent variable quantity.

Recorders are known in which the ink receptive medium is a strip chart in the form of a roll of paper having spaced perforations along its two longitudinal edges. A pair of sprockets, rotated in response to the independent variable, engage in these perforations and transport the chart lengthwise, thus generating the abscissa. The recording pen is normally mounted for rectilinear motion on a fixed pen bridge spanning a width of the chart. A pen drive mechanism generates the ordinate by positioning the pen in response to the dependent variable, with the result that when the chart and the pen are both on the move an ink trace is left on the chart which plots the ordinate against the abscissa, or in other words, the dependent variable against the independent variable. The plot thus produced may be used as a permanent record, if desired, once the ink has been allowed to dry.

In some applications, the abscissa represents time, in which case the strip chart is usually driven by a synchronous motor supplied from the AC mains. The dependent variable is therefore plotted as a function of time in a mode of operation that is expedient to call "time drive mode". In other applications, the abscissa represents a quantity that is scanned within a predetermined range of values. This mode of operation may be called "scan mode".

Recording spectrophotometers may usually be operated either in the drive mode or the scan mode. In the first mode, changes of the sample under analysis as evidenced by changes in the configuration of the trace on the chart are observed at a fixed wvelength value of the photometric radiation over a given time interval. The changes may be due to some chemical reaction, for example, and are evaluated as changes in sample percentage transmission (or absorption) with the passing of time at one selected radiation wavelength. In the other mode, a chart drive mechanism transports the strip chart in response to scanned values of the photometric radiation wavelength and the pen drive mechanism positions the pen on the chart to represent percentage sample transmission (or absorption) at the instantaneous wavelength scanned. In this latter mode, it is usual for the chart abscissa to represent wavenumbers although the quantity scanned is in fact wavelength. This is merely a matter of convenience.

Now, whether a recorder is embodied in a spectrophotometer or not, and whether it is used in the time drive mode or in the scan mode, the need often arises for producing repeat recordings on the same segment of chart, for easy comparison of the superimposed traces this produced.

In the case of a spectrophotometer, for example, repetitive scanning between moderately spaced wavelength limits is a facility frequently included in the instrument design, because the analyst is often interested in monitoring sample changes with time by keeping certain bands of the spectrum under observation by repetitively scanning through them. If the sample does undergo changes, the successive traces will not superimpose exactly and the deviations will be immediately apparent to the analyst. This mode may be identified as the repetitive scan mode.

The recording pen drive means naturally plays a dominant part in the performance of a strip chart recorder. Where sensitivity is particularly important, such as in spectrophotometric applications, the recorder is designed to make the movement of the pen across the chart as smooth as possible. To this end, a polished platen is frequently provided and the chart passes on this platen while the pen bears upon the free surface of the chart. Additionally, a smooth-faced pressure roller disposed just upstream of the pen is used to hold down the chart against the platen so that a smooth line of contact between the paper and the platen is maintained along the path of the pen. Finally, the recording pen is chosen in conjunction with a suitably matched ink so as to leave a clear trace with a comparatively low pressure at all recording speeds normally encountered in the instrument operation.

Ball-point pens have been used in some strip chart recorders. They are unsuitable, however, for fast responding recorders because they generally require high pressure contact between the pen and the chart, which makes precise movement of the pen difficult to achieve.

Recording pens in which a carefully controlled capillary ink vein is continuously available at the pen tip need only bear lightly on the chart surface in order to provide a clear trace. For this reason, such recording pens are often used where it is important to maintain minimum mechanical loading of the pen drive mechanism. Indeed, such pens are frequently used in high-performance spectrophotometers and in the description which follows, they shall be referred to as capillary pens.

In a spectrophotometric recorder, the chart may be transported at widely varying rates and for very different durations. Moreover, where sharp peaks are encountered in the recorded spectrum, the back and forth motion of the capillary pen may indeed be very fast compared with that encountered where only the base line is being recorded. Consequently, the ink flow must be rapid enough so that a clear line will be recorded on the strip chart while the capillary pen is moving at its highest velocity and yet not so rapid as to cause blots when the pen is moving slowly. The visosity of the ink in relation to the recording pen design is, therefore, very important but equally important is its drying characteristic. Slow drying makes the trace prone to smudging and fast drying tends to clog the capillary passage in the recording pen.

In practice, medium speed drying recording inks are normally employed with capillary pens of the type used in strip chart recorders. Depending on ambient conditions and thickness of the trace, such inks may take 15 minutes or more to dry. Despite this, smudging is not a serious problem as long as the chart is driven continuously in a forward direction and care is taken in handling the chart after a trace has been recorded and prior to the ink drying.

Where fast repetitive recording over a given portion of a strip is called for, however, the above-described recorder produces large smudges on the chart which mar the recordings. The smudges are caused by ink being first picked up by the smooth-faced pressure roller which urges the chart towards the platen and then offset elsewhere on the chart. In some cases, the pressure roller appears to act as a squeegee, literally spreading the wet ink over the chart. The problem is particularly serious where the trace is very complex and the peaks are crowded together.

Any attempt to overcome this problem by minimizing contact between the pressure roller and the chart in order to reduce the risk of ink transfer between chart and roller impairs the hold down function of the roller and leads to recordings of poor quality. Therefore, smudging of the tracing has been largely tolerated hitherto as being unavoidable in fast repetitive strip chart recording operations.

According to the present invention there is provided recording apparatus of the type defined comprising a platen and a pressure roller which is adapted in operation to hold down a strip chart in contact with said platen so as to present a substanially even contact between the chart and the platen along the track of the recording pen, said pressure roller being provided with a plurality of grooves extending along the working length thereof, said grooves being separated by narrow crests.

The density of the grooves around the cylindrical surface of the pressure roller is naturally important as can be readily appreciated by reasoning that the high-density extreme must approximate the unsatisfactory operation of the plain-faced roller and the low-density extreme must impair the hold down action on the chart. The correct density is best established by trial and error in conjunction with a particular ink recommended either by the manufactures of the recording pen or the suppliers of ink.

We have found, for example, that with an ink designated SF/245 supplied by H. C. Stephens Limited in a Rotring pen (manufactured by Rotring-Werke of Western Germany) having a 0.3mm stylus and a pressure roller 3/16 inch in diameter provided with 32 uniformally spaced longitudinal grooves a good anti-smudge peformance is achieved in fast repetitive scanning, superior to that obtained with rollers of the same diameter but provided with either 40 or 20 grooves.

It is possible, but it has not been established so far, that the anti-smudge action depends on the avoidance of squeegee action and the provision of grooves capable of securing adequate blotting up of the surplus ink in the nearly superimposed traces. The first requirement would appear to call for comparatively low groove density and the second for comparatively high density. A compromise must obviously be reached between the two opposites but fortunately an area of low criticality appears to exist between clearly unsatisfactory density limits.

The pressure roller may be advantageously incorporated in a paper tear-off unit provided with a keen edge for enabling the user to tear off the chart along the edge with one hand while holding down the unit with the other hand and in so doing pressing the paper hard against the platen.

A practical embodiment of the present invention, forming part of a spectrophotometric apparatus but in fact adaptable for similar applications, is depicted in the attached formal diagrammatic drawing, wherein an assembly generally indicated at 1 comprises a plastic moulding 1A having a U-shaped longitudinal boundary portion defining limbs 1B and an opposite longitudinal boundary portion terminating in a keen edge 1C.

Trunnions 1D1 and 1D2 intermediate between the said longitudinal boundary parts are journalled in frame parts 6A and 6B of the apparatus and thus mount the assembly 1 for pivotal movement around the longitudinal axis of the trunnions.

A pressure roller 1E provided with anti-smudging longitudinal grooves bound by sharp crests (the measured width was between 0.2 and 0.3mm) is mounted for free rotation in the limbs 1B. In the drawing the assembly 1 is tilted so that the pressure roller 1E bears against the chart 2, the pressure being resisted by the semi-circular surface portion 3A and platen 3, further including a plane surface 3B against which the chart 2 may be urged when the assembly 1 is tilted in the opposite direction to that shown. Edge perforations 2A in chart 2 engage a pair of sprockets 4A and 4B, which when rotated anticlockwise by chart drive means (not shown) transport the chart 2 in the direction of arrow A. The sprockets are pinned to shaft 5 journalled in apparatus frame parts 6A and 6B. They are spaced by the distance separating the two lines of chart perforations and only sprocket 4A in the foreground is visible: sprocket 4B is hidden by the chart 2. The platen 3 is slotted to enable the sprocket teeth to emerge there through and engage the chart 2. A capillary pen 7 is screwed into pen carrier 8 which is slidably mounted for rectilinear to and fro movement on rod 9 fixed to frame parts 6A and 6B. Rod 9 represents what is known in the art as a pen bridge, straddling the width of the chart 2. In the drawing, the writing stylus of the capillary pen 7 is shown in contact with the chart 2, on which a trace 2B has been drawn.

A torsion spring 10 around trunnion 1D1 biasses the assembly 1 clockwise and maintains it in the attitude depicted every time a recording run is in progress. One end of the spring 10 is anchored to the frame part 6B and the other is hooked onto the limb 1B. Before the chart 2 is reversed to a given scan start position to commence repetitive scanning and recording runs as hereinbefore explained, both the bar 1E and the pen 7 are lifted off the chart 2. To this end, there is provided an electromagnetic actuator 11 which is continuously energized during recording and comprises an armature 11A fitted with return spring 11B. Before the chart 2 is reversed, the actuator 11 is de-energized. This causes the spring 11B to swing the armature 11A away from the magnetic core 11C and the stud 11D fixed to armature 11A to strike the arm 12A of block 12 pinned to trunnion 1D2, which is thus subjected to an anti-clockwise torque. Because the strength of spring 11B is proportioned relatively to that of spring 10 so that the latter always yields when opposed by the former, the assembly 1 turns anti-clockwise and the bar 1E lifts off the chart 2. A further arm 12B of block 12 acts as a manual control. A wedge-shaped projection 8A of pen carrier 8 just clears the pressure roller 1E. When the assembly 1 is swung over, either electromagnetically or manually, in the manner described, the roller 1E contacts the projection 8A and the pen carrier 8 is swung clock-wise so as to lift the pen 7 off the chart 2, whatever the position of the pen 7 along the width of the chart 2.

This prevents a trace being drawn while the chart 2 is being reversed. Before resumption of forward scan the assembly is tilted back to the position shown in the drawing and the pen will again bear upon the chart.

Now, when the first repeat run commences the pressure roller 1E comes into contact with the trace produced in the initial run, which has not yet had time to dry. A plain-faced roller would cause smudging tending to get progressively worse as more and more repeat runs were completed. The grooves provided in pressure roller 1E, which are generally V-shaped, appear to remove the surplus ink from the wet traces. Their action is not clearly understood but the anti-smudging performance is positive. The density of the grooves, the diameter of the roller, the type of recording pen and the ink to which the drawing is to be related are as indicated earlier.

When the operator desires to tear off the portion of the chart downstream of edge 10, he tilts the assembly 1 by pressing on it with the right hand so as to bring the edge 1C down and force the chart hard against the platen surface portion 3B. Using the edge 1C as a tear-off guide, he pulls the chart towards him with the left hand and tears it off clearly in one determined sweep.

What is claimed is:

1. An improved strip chart recorder comprising, in combination:
    a platen with a smooth arcuate surface;
    a strip chart;
    a chart advancing means coupled to said strip chart to advance said strip chart over said platen in a forward direction;
    a wet-ink recorder pen mounted for rectilinear motion longitudinally of said platen;
    a pressure roller disposed adjacent said platen and upstream of said recorder pen with reference to said forward direction with said strip chart passing between said roller and said platen, said roller being non-yielding under pressure and having a plurality of longitudinally extending grooves in the surface of said roller, each of said grooves being separated from adjacent grooves by a narrow crest, each said groove having a length sufficient to extend over the entire working surface of said chart; and
    means to support said roller adjacent said platen permitting free rotation thereof about its rotation axis and selectively urge said roller either towards or away from said platen with said strip chart disposed therebetween, said roller being urged toward said platen when said chart is advanced in said forward direction by said advancing means and urged away from said chart when said chart is not being advanced.

2. The improved strip chart recorder of claim 1 additionally including:
    means coupled to said pressure roller to displace said recorder pen from said chart and platen when said roller is urged away from said platen permitting the chart to be drawn backwardly to allow the same portion of the chart to be recorded on many times.

3. A strip chart recorder adapted to produce a recording in the form of a wet ink trace over a portion of a chart length advanced in a forward direction from a start datum and to repeat the recording over the same portion a plurality of times, each time after rewinding the chart to said start datum, comprising, in combination:
    means adapted to advance a strip chart in a forward direction;
    a platen with a smooth surface extending at least across the full working width of the chart bearing against the undersurface thereof;
    a wet-ink recorder pen mounted for rectilinear motion longitudinally of said platen;
    a pressure roller mounted upstream of the recorder pen with reference to said forward direction and extending lengthwise of the said platen at least the full working width of the chart; and
    means to support said pressure roller adjacent said platen and allow said roller to be selectively urged towards and away from said platen with the strip chart therebetween, said roller including a plurality of grooves sunk into the surface thereof having a length at least equal to the entire working width of the chart, each said groove being separated from each of its two adjacent grooves by a narrow crest, said pressure roller in operation being lifted and lowered during rewind and forward movement of the chart, respectively, said grooves minimizing ink smudging in repeat forward movement of the chart.

4. The strip chart recorder of claim 3 wherein each said crest has a width which is smaller than the width of a groove.

5. The strip chart recorder of claim 3 wherein said roller is made of a sufficiently rigid material that it is not deformed when in pressure contact with the chart as it moves over said platen.

6. An improved strip chart recorder adapted to recording repetitively over the same portion of a strip chart without smudging wet ink traces already on the chart comprising, in combination:
    means adapted to advance a strip chart in a forward direction;
    a platen with a smooth arcuate surface over which a strip chart is advanced by said advancing means;
    a pressure roller disposed adjacent said platen with its rotation axis oriented substantially transverse to the direction of strip chart movement, said roller including a plurality of longitudinally running grooves in the surface of said roller, each said groove being disposed substantially parallel to the rotation axis of said roller and being separated from adjacent grooves by a narrow crest, said pressure roller being adapted for maintaining pressure contact with a strip chart that is drawn over the platen by said advancing means;
    a recording pen disposed for motion in a linear direction substantially parallel to said pressure roller and disposed for recording on the strip chart as it is drawn over the platen by said advancing means; and
    means to move said roller away from said platen and means coupled to said roller to move said recording pen from the chart surface when said roller moves away from said platen.

7. An improved strip chart recorder comprising, in combination:
    a platen with a smooth arcuate surface;
    a strip chart;
    a chart advancing means coupled to said strip chart to advance said strip chart over said platen in a forward direction;
    a pressure roller disposed adjacent said platen with said strip chart passing between said roller and said platen, said roller having a plurality of longitudinally extending grooves in the surface of said roller, each said groove being separated from adjacent grooves by a narrow crest;
    means to press said roller towards said platen to hold said strip chart against said arcuate surface, the pressure exerted thereby on said strip chart being sufficient to conform said chart to said arcuate surface as it is advanced by said advancing means;

a recording pen disposed in recording contact with said strip chart adjacent said arcuate surface, said recording pen being movable in a direction transverse to said forward direction; and means coupled to said pressure roller to displace said roller away from said chart and platen permitting said chart to be freely moved between said roller and said platen and means cooperative with said recording pen and said means coupled to said roller to displace said pen from contact with said chart when said roller is displaced away from said chart and platen.

8. An improved strip chart recorder comprising, in combination:

a platen with a smooth arcuate surface;

a pressure roller with a plurality of elongated grooves in the roller surface, each of said grooves being separated from adjacent grooves by a crest;

a roller support member for supporting said roller at opposite ends thereof;

pressure exerting means cooperatively operable with said roller support and said pressure roller to force said roller towards said platen to force a chart disposed between said roller and said platen against said platen;

a recording instrument for recording on a strip chart, said instrument being disposed for linear movement while recording on a strip chart movable over said arcuate surface;

a roller displacement means cooperative with said roller to overcome said pressure exerting means to move said roller away from said platen and means cooperative with said roller displacement means and said recording instrument to displace said recording instrument away from contact with a strip chart movable over said arcuate surface when said roller is displaced away from said platen.

9. The improved strip chart recorder of claim 8 wherein each said crest has a width smaller than the width of any said groove.

10. The improved strip chart recorder of claim 8 wherein said pressure roller is made of a sufficiently rigid material that is not deformed when in pressure contact with a strip chart.

11. The improved strip chart recorder of claim 8 wherein said roller support permits said roller to freely rotate when it is in pressure contact with a strip chart.

12. An improved strip chart recorder comprising, in combination:

a platen with a smooth arcuate surface;

a pressure roller with a plurality of elongated grooves extending substantially the length of said roller in the surface thereof, each said groove being separated from adjacent grooves by a crest, each of said crests having a width smaller than the width of each said groove;

a roller support member for supporting said roller at opposite ends thereof and permitting free rotation thereof; and pressure exerting means cooperatively operable with said roller support and said pressure roller to force said roller toward said platen to force a chart disposable between said roller and said platen against said platen.

13. The strip chart recorder of claim 12 wherein said roller support includes a shearing edge movable into contact with a chart to permit a portion thereof to be cut from the remaining chart.

* * * * *